(12) United States Patent  (10) Patent No.: US 7,823,320 B1
Nelson  (45) Date of Patent: Nov. 2, 2010

(54) AIR-ACTUATED WING ASSEMBLIES

(76) Inventor: Charles W. Nelson, 245 Cane Bend Dr., Haughton, LA (US) 71037

( * ) Notice: Subject to any disclaimer, the term of this patent is extended or adjusted under 35 U.S.C. 154(b) by 27 days.

(21) Appl. No.: 12/231,387

(22) Filed: Sep. 2, 2008

Related U.S. Application Data

(63) Continuation-in-part of application No. 29/301,876, filed on Mar. 20, 2008, which is a continuation of application No. 11/728,088, filed on Mar. 23, 2007, now abandoned.

(51) Int. Cl.
*A01M 31/06* (2006.01)
(52) U.S. Cl. ............................................. 43/3; 446/217
(58) Field of Classification Search .................. 43/2, 43/3; 116/22 A; 446/176, 217, 218, 201, 446/246; 40/412, 417; 359/250, 522, 525, 359/439–441; 244/35 R, 45 R, 153 R, 154, 244/153 A, 155 R
See application file for complete search history.

(56) References Cited

U.S. PATENT DOCUMENTS

| | | | | |
|---|---|---|---|---|
| 3,221,440 A | * | 12/1965 | Gutierrez .................... | 446/201 |
| 3,974,369 A | * | 8/1976 | Chmela et al. ............... | 362/190 |
| 4,475,674 A | | 10/1984 | Farmer ........................ | 224/153 |
| 4,507,096 A | | 3/1985 | Greenfield, Jr. .............. | 446/176 |
| 4,530,477 A | | 7/1985 | Ito et al. ...................... | 244/153 |
| 4,620,385 A | | 11/1986 | Carranza et al. ................. | 43/3 |
| 5,862,619 A | * | 1/1999 | Stancil ............................ | 43/3 |
| 6,574,904 B1 | | 6/2003 | Fencel et al. ..................... | 43/3 |
| 6,678,979 B2 | | 1/2004 | Lim et al. ...................... | 40/412 |
| 6,769,950 B1 | | 8/2004 | Suciu ........................ | 446/176 |

* cited by examiner

*Primary Examiner*—Joshua J Michener
(74) *Attorney, Agent, or Firm*—R. Keith Harrison

(57) ABSTRACT

An air-actuated wing assembly includes a wing body; at least one half-wing portion having a generally elongated, flexible, cupped wing panel extending from the wing body; and an attachment mechanism carried by the wing body. In some embodiments, the air-actuated wing assembly includes an assembly base; a wing support assembly carried by the assembly base; at least one half-wing portion having a generally elongated, flexible, cupped wing panel rotatably carried by the wing support assembly; and an attachment mechanism carried by the assembly base. A fowl decoy is also disclosed.

7 Claims, 9 Drawing Sheets

AIR-ACTUATED WING ASSEMBLIES

CROSS-REFERENCE TO RELATED APPLICATIONS

This application is a continuation-in-part of U.S. design patent application Ser. No. 29/301,876, filed Mar. 20, 2008, which is a continuation of U.S. utility patent application Ser. No. 11/728,088, filed Mar. 23, 2007 and entitled "Air-Actuated Devices", now abandoned.

FIELD

The present invention relates to devices which move in response to flowing air. More particularly, the present invention relates to air-actuated wing assemblies which oscillate in response to flowing air and have a variety of applications.

BACKGROUND

Various devices are known which flutter, flap, wave, oscillate or fly in response to wind or other flowing air. For example, patio ornaments are known which are made of strips of paper or plastic and can be suspended from a patio cover or the like. The patio ornaments may be multi-colored to impart an attention-attracting appearance when blown by the wind. Kites, another type of well-known wind-actuated device, are suitable for providing hours of entertainment. Air-actuated devices may be useful in attracting game fowl when provided on a decoy.

SUMMARY

The present disclosure is generally directed to an air-actuated wing assembly. An illustrative embodiment of the air-actuated wing assembly includes a wing body; at least one half-wing portion having a generally elongated, flexible, cupped wing panel extending from the wing body; and an attachment mechanism carried by the wing body. In some embodiments, the air-actuated wing assembly includes an assembly base; a wing support assembly carried by the assembly base; at least one half-wing portion having a generally elongated, flexible, cupped wing panel rotatably carried by the wing support assembly; and an attachment mechanism carried by the assembly base.

The present disclosure is further generally directed to a fowl decoy. An illustrative embodiment of the fowl decoy includes a decoy tail portion having a simulated decoy tail and an air-actuated wing assembly including at least one half-wing portion having a generally elongated, flexible, cupped wing panel carried by the simulated decoy tail.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Figure 1:
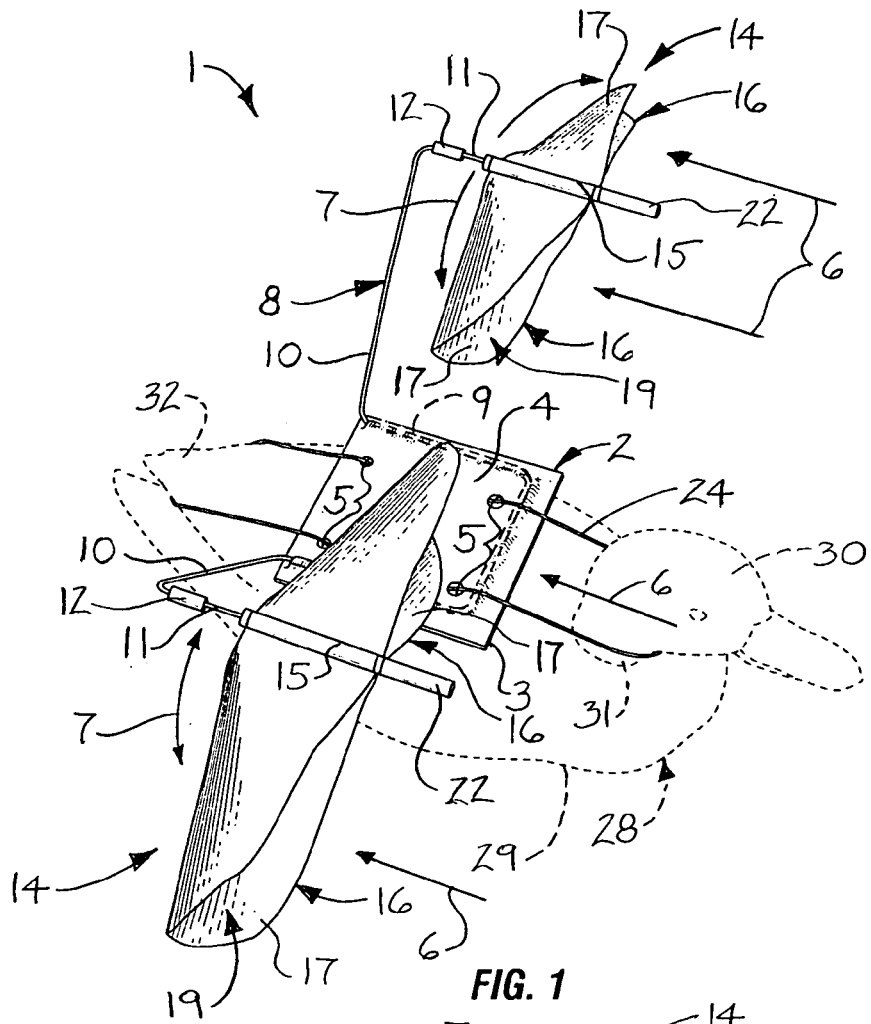
FIG. 1 is a perspective view of an illustrative embodiment of an air-actuated wing assembly, mounted on a fowl decoy (shown in phantom)

Referring initially to FIG. 1 of the drawings, an illustrative embodiment of the air-actuated wing assembly, hereinafter assembly, is generally indicated by reference numeral 1. The assembly 1 includes an assembly base 2 which is adapted for attachment to a decoy 28 such as that which simulates a waterfowl, for example, as will be hereinafter described. The assembly base 2 may have a base panel 3. The base panel 3 may have a generally square or rectangular shape, as shown, for example and without limitation. A base cover 4 may be provided on the base panel 3. The base cover 4 may be paper, plastic or plastic-coated paper, for example and without limitation.

A wing support assembly 8 is provided on the assembly base 2. The wing support assembly 8 may include a base portion 9 (shown in phantom) and a pair of spaced-apart extending segments 10 which extend from the base portion 9. The base portion 9 of the wing support assembly 8 may have a generally "U"-shaped configuration. The base portion 9 may be attached to the assembly base 2 according to any suitable technique which is known by those skilled in the art. In some embodiments, the base portion 9 of the wing support assembly 8 may be sandwiched between the base panel 3 and the base cover 4. The extending segments 10 may angle outwardly away from each other. A wing support segment 11 extends from each extending segment 10. Each wing support segment 11 may be disposed in generally parallel relationship with respect to the plane of the base panel 3 of the assembly base 2.

An air-actuated wing 14 is rotatably mounted on each wing support segment 11 of the wing support assembly 8. Each air-actuated wing 14 may be a flexible material such as paper or plastic, for example and without limitation, and may include a generally elongated, tubular wing body 15 that receives the corresponding wing support segment 11. A pair of half-wing portions 16 extends from opposite sides of the wing body 15. Each half-wing portion 16 may include a generally elongated, curved wing panel 17 having a generally C-shaped cross-sectional configuration. The wing panel 17 of each half-wing portion 16 has a cup-shaped configuration and defines a wing interior 19 which progressively widens from the wing body 15 toward the tip of each half-wing portion 36. A wing retainer 22 and at least one wing spacer 12 may be provided on each wing support segment 11 to position the air-actuated wing 14 on the corresponding wing support segment 11.

In typical application of the assembly 1, the assembly base 2 is attached to a waterfowl decoy 28 such as that which simulates a duck, for example and without limitation. The decoy 28 may have a conventional design and appearance and may include a buoyant plastic or other material decoy body 29, a decoy head 30 provided on a decoy neck 31 which extends from the decoy body 29, and a decoy tail 32 which is opposite the decoy head 30. The assembly base 2 may be attached to the decoy body 29 of the decoy 28 using any suitable attachment technique which is known by those skilled in the art. In some embodiments, two pairs of spaced-apart cord openings 5 may extend through the assembly base 2. A continuous attachment cord 24 is extended through each pair of cord openings 5 and around the decoy neck 31 and the decoy tail 32, respectively, of the decoy 28. The wing interior 19 of each half-wing portion 16 faces the decoy head 30 of the decoy 28. Alternatively, in some applications the wing interior 19 of each half-wing portion 16 may face the decoy tail 32 of the decoy 28.

The decoy 28 with the air-actuated wing assembly attached thereto may be placed on a water body (not illustrated) for the purpose of attracting game fowl during fowl hunting. Accordingly, as wind 6 blows into the wing interior 19 and against the interior cupped surfaces of each wing panel 17, each air-actuated wing 14 rotates on the corresponding wing support segment 11 of the wing support assembly 8 as indicated by the curved arrow 7. The rotating air-actuated wings 14 may attract game fowl (not illustrated) to the area of the water body on which the decoy 28 floats.

Figure 2:
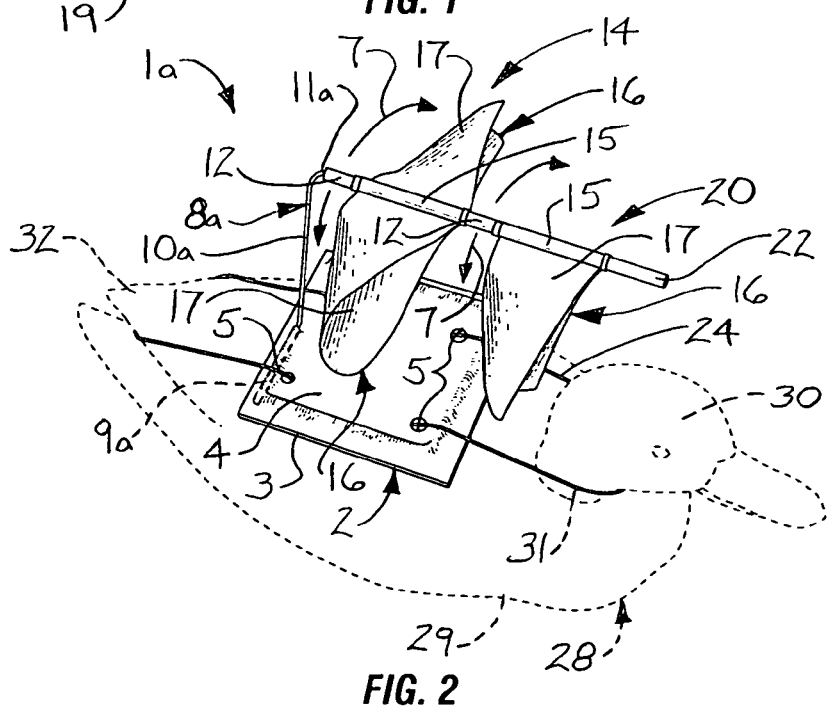
FIG. 2 is a perspective view of an alternative illustrative embodiment of an air-actuated wing assembly, mounted on a fowl decoy (shown in phantom)
Figure 7:
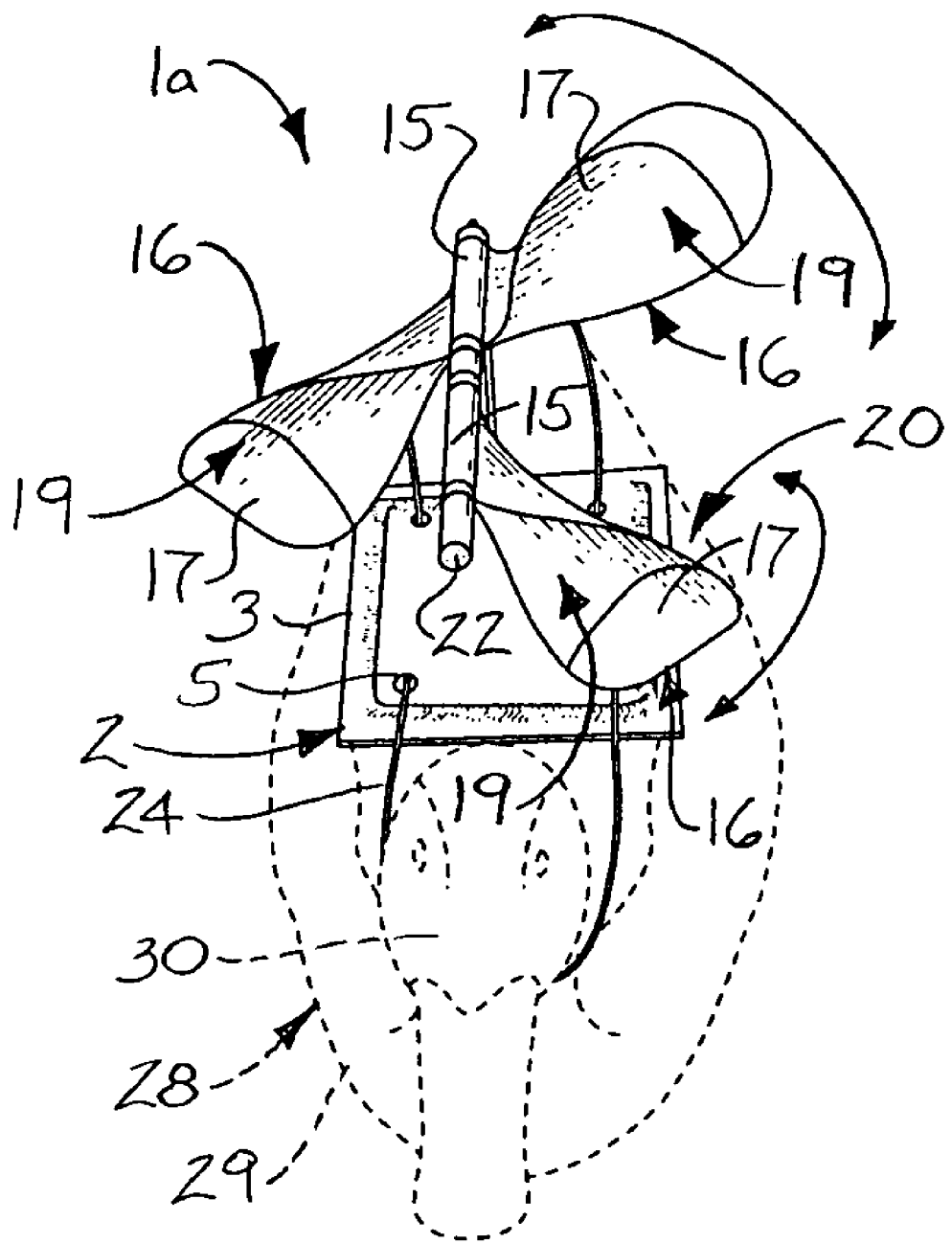
FIG. 7 is a front perspective view of the illustrative embodiment of the air-actuated wing assembly illustrated in FIG. 2, mounted on a fowl decoy (shown in phantom)

Referring next to FIGS. 2 and 7 of the drawings, an alternative illustrative embodiment of the air-actuated wing assembly 1a includes a wing support assembly 8a which extends from the assembly base 2. The wing support assembly 8a may include a generally elongated base portion 9a (shown in phantom) which may be sandwiched between the base panel 3 and the base cover 4 of the assembly base 2. A single extending segment 10a may extend from the base portion 9a. A wing support segment 11a extends from the extending segment 10a.

An air-actuated wing 14, which may be similar in design to the air-actuated wing 14 heretofore described with respect to FIG. 1, is provided on the wing support 11a of the wing support assembly 8a. An air-actuated half wing 20 may additionally be provided on the wing support segment 11a. The air-actuated half wing 20 may include a half-wing portion 16 of the air-actuated wing 14, having a wing body which receives the wing support segment 11a and a generally elongated, curved or cupped wing panel 17 which extends from the wing body 15.

In application, the assembly 1a may be attached to a decoy 28 for the purpose of attracting game fowl for fowl hunting, as was heretofore described with respect to the assembly 1 in FIG. 1. Accordingly, as wind (not illustrated) contacts the wing interior 19 of the air-actuated wing 14 and of the air-actuated half wing 20, the air-actuated wing 14 and the air-actuated half wing 20 each rotates on the wing support segment 11a of the wing support assembly 8 as indicated by the curved arrows 7. This rotating motion may attract game fowl (not illustrated) to the area of the water body on which the decoy 28 floats.

Figure 3:
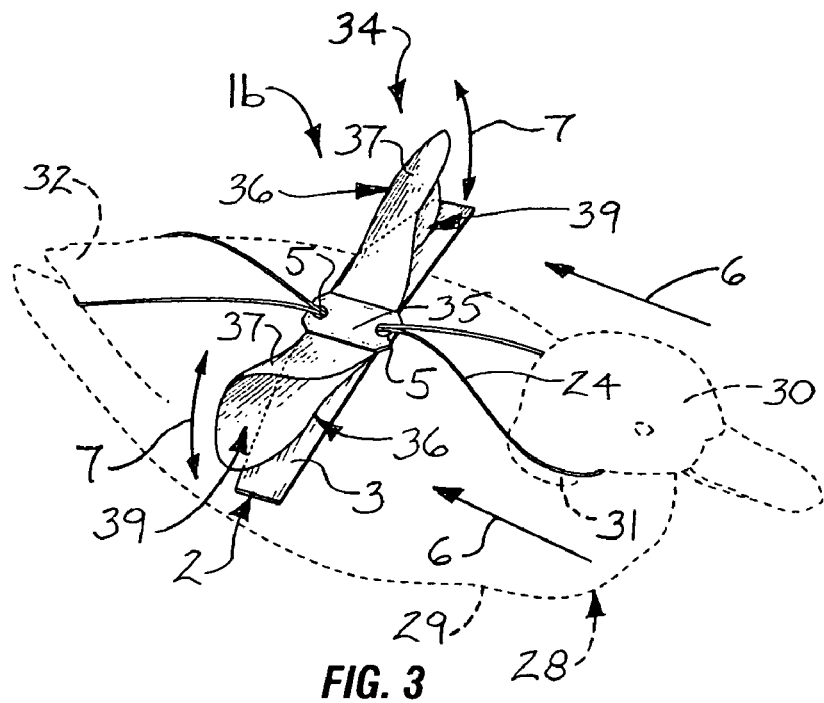
FIG. 3 is a perspective view of still an alternative illustrative embodiment of an air-actuated wing assembly, mounted on a fowl decoy (shown in phantom)

Referring next to FIG. 3 of the drawings, another alternative illustrative embodiment of the air-actuated wing assembly 1b includes a assembly base 2 which may have a generally elongated shape. A wing body 35, which may have a generally elongated and flat configuration, is provided on the assembly base 2. The wing body 35 may be attached to the assembly base 2 using adhesives, hook-and-loop fasteners, an attachment cord 24 and/or any other suitable fastening technique which is known by those skilled in the art. In some embodiments, a pair of spaced-apart cord openings 5 may extend through the wing body 35 and through the assembly base 2 to receive the attachment cord 24, which facilitates attachment of the assembly 1b to the decoy 28, as was heretofore described.

A pair of half-wing portions 36 extends from opposite sides of the wing body 35. Each half-wing portion 36 may include a generally elongated, curved or cupped wing panel 37 having a wing interior 39. The wing panel 37 of each half-wing portion 36 may progressively widen from the wing body 35 toward the tip of each half-wing portion 36.

Application of the assembly 1b may be as was heretofore described with respect to the assembly 1 in FIG. 1 and the assembly 1a in FIG. 2. However, as wind 6 contacts the cupped interior surfaces of each wing panel 37, the half-wing portions 36 repeatedly oscillate in an up-and-down motion as indicated by the arrows 7.

Figure 4:
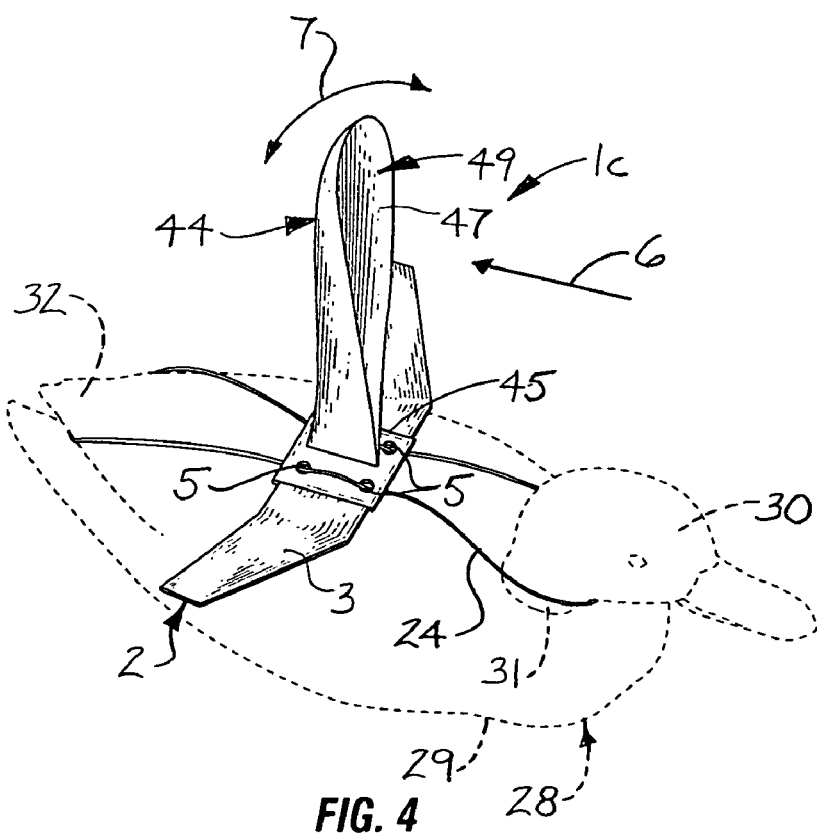
FIG. 4 is a perspective view of yet an alternative illustrative embodiment of an air-actuated wing assembly, mounted on a fowl decoy (shown in phantom)

Referring next to FIG. 4 of the drawings, another alternative illustrative embodiment of the air-actuated wing assembly 1c includes a assembly base 2 having a base panel 3 which may have a generally elongated shape. A wing body 45 is provided on the assembly base 2 and may have a generally square or rectangular shape. An air-actuated half wing 44 extends from a surface of the wing body 45. The air-actuated half wing 44 may include a generally elongated, curved or cupped wing panel 47 having a wing interior 49. The wing panel 47 of the air actuated half-wing 44 may progressively widen from the wing body 45 toward the tip of the air-actuated half-wing 44. The air actuated half-wing 44 may normally be disposed in generally perpendicular relationship with respect to the longitudinal axis of the assembly base 2. Application of the assembly 1c may be as was heretofore described. Accordingly, the blowing of wind 6 into the wing interior 49 and against the interior cupped surfaces of the wing panel 47 causes the air-actuated half wing 44 to repeatedly oscillate in a side-to-side motion as indicated by the curved arrow 7.

Figure 5:
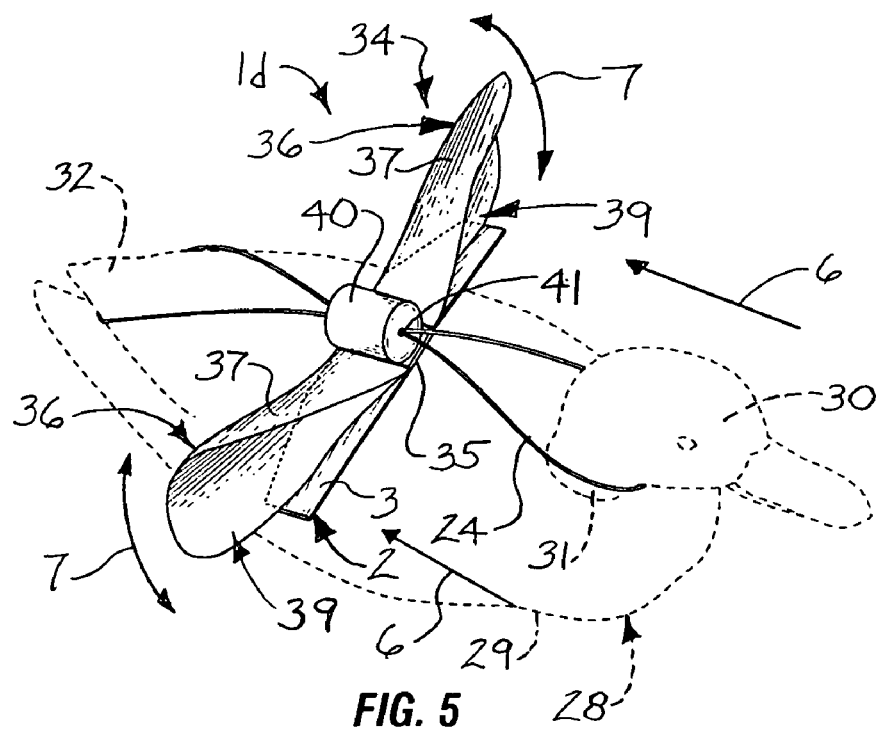
FIG. 5 is a perspective view of yet an alternative illustrative embodiment of an air-actuated wing assembly, mounted on a fowl decoy (shown in phantom)

Referring next to FIG. 5 of the drawings, in another alternative illustrative embodiment, the air-actuated wing assembly 1d may be similar in design to the air-actuated wing assembly 1b which was heretofore described with respect to FIG. 3. The assembly 1d includes a wing spacer 40 which may have a generally elongated, cylindrical configuration and is provided on the wing body 35. The wing spacer 40 may be a resilient material such as rubber or foam rubber, for example and without limitation. In some embodiments, a cord opening 41 extends through the wing spacer 40 and the attachment cord 24 extends through the cord opening 41. Accordingly, as wind 6 contacts the cupped interior surfaces of the wing panel 37 inside the wing interior 39, the half-wing portions 36 repeatedly oscillate in an up-and-down motion as indicated by the arrows 7. The wing spacer 40 prevents over-bending of each of the oscillating half-wing portions 36 at the wing body 35.

Figure 6:
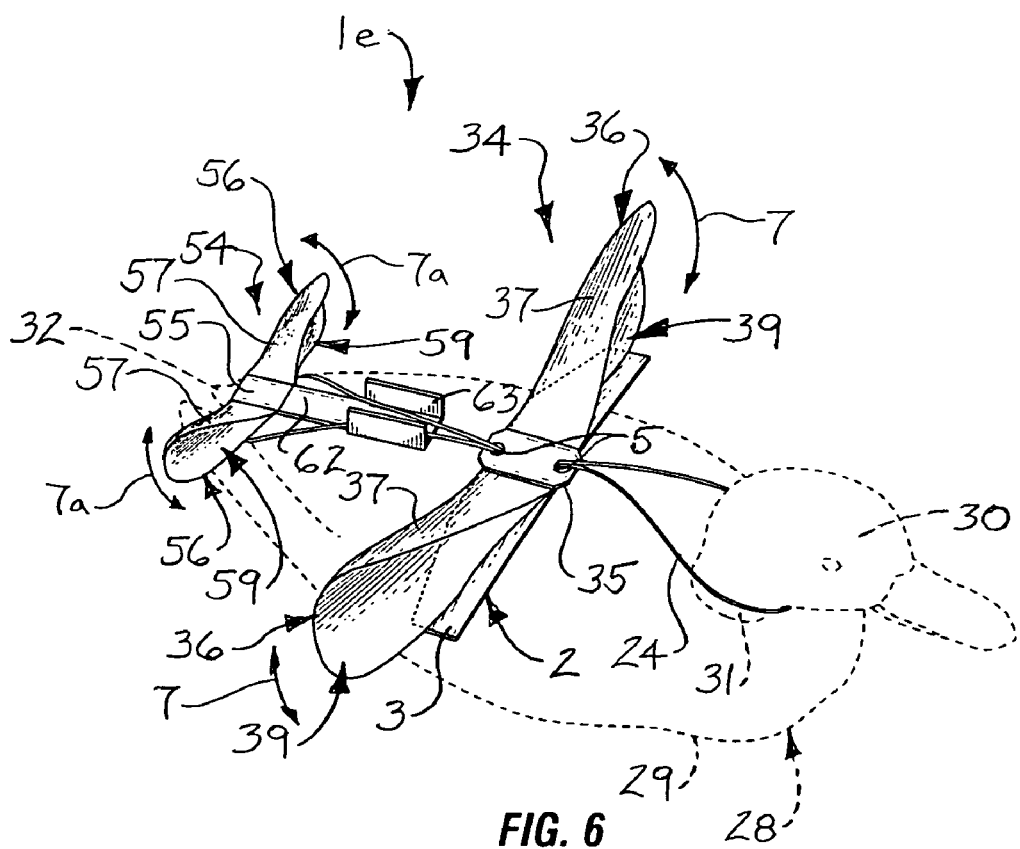
FIG. 6 is a perspective view of another alternative illustrative embodiment of an air-actuated wing assembly, mounted on a fowl decoy (shown in phantom)

Referring next to FIG. 6 of the drawings, another alternative illustrative embodiment of the air-actuated wing assembly 1e includes an air-actuated forward wing 34 which may be similar in design as that which was heretofore described in FIG. 3. The air-actuated wing assembly 1e may additionally include an air-actuated rearward wing 54 having a wing body 55. A pair of half-wing portions 56 extends from respective sides of the wing body 55. Each half-wing portion 56 may include a cupped wing panel 57 which defines a wing interior 59. In some embodiments, a generally elongated wing body extension 62 extends forwardly from the wing body 55. A cord guide 63 is provided on the wing body extension 52. The attachment cord 24 extends through a pair of spaced-apart cord openings 5 provided in the wing body 35 and further extends through the cord guide 63. A front loop of the attachment cord 24 may be extended around the neck 31 of a decoy 28, whereas a rear loop of the attachment cord 24 may be extended around the tail 32 of the decoy 28, to attach the air-actuated forward wing 34 and the air-actuated rearward wing 54 to the decoy 28. As wind 6 contacts the cupped interior surfaces of the wing panels 37 of the air-actuated forward wing 34 and the cupped interior surfaces of the air-actuated rearward wing 54, the half-wing portions 36 of the air-actuated forward wing 34 oscillate as indicated by the arrows 7 and the half-wing portions 56 of the air-actuated rearward wing 54 oscillate as indicated by the arrows 7a, respectively.

Figure 8:
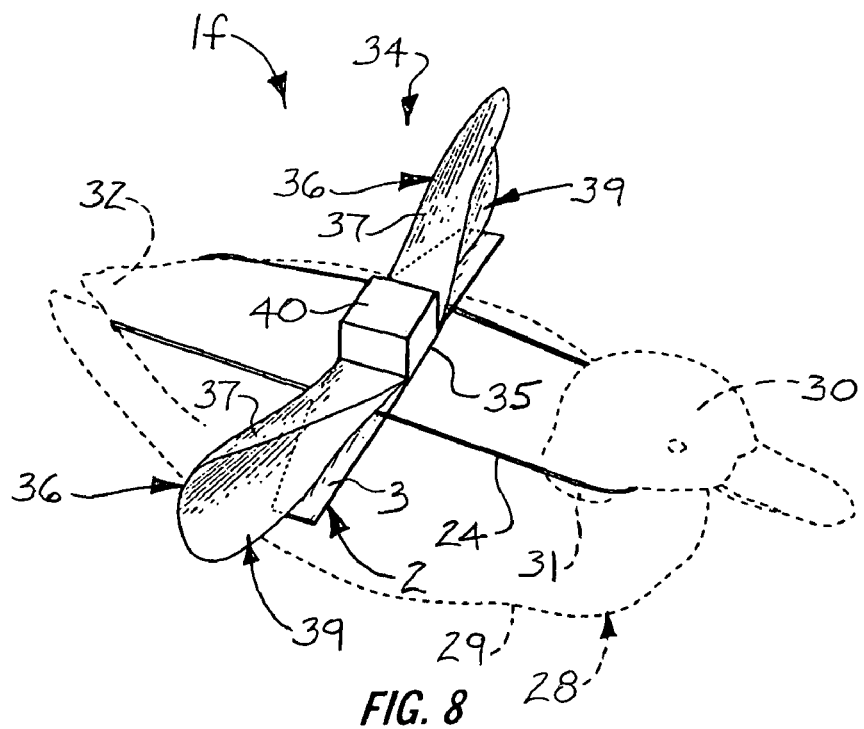
FIG. 8 is a perspective view of another alternative illustrative embodiment of the air-actuated wing assembly, mounted on a fowl decoy (shown in phantom)

Referring next to FIG. 8 of the drawings, another alternative illustrative embodiment of the air-actuated wing assembly 1f may be similar in design as the air-actuated wing assembly 1d which was heretofore described with respect to FIG. 5, except the wing spacer 40 may have a generally rectangular or box-shaped configuration rather than a generally elongated, cylindrical configuration as is the case with respect to the wing spacer 40 of the air-actuated wing assembly 1d in FIG. 5. The attachment cord 24 may extend between the assembly base 2 and each half-wing portion 36 on a corresponding side of the wing spacer 40.

Figure 9:
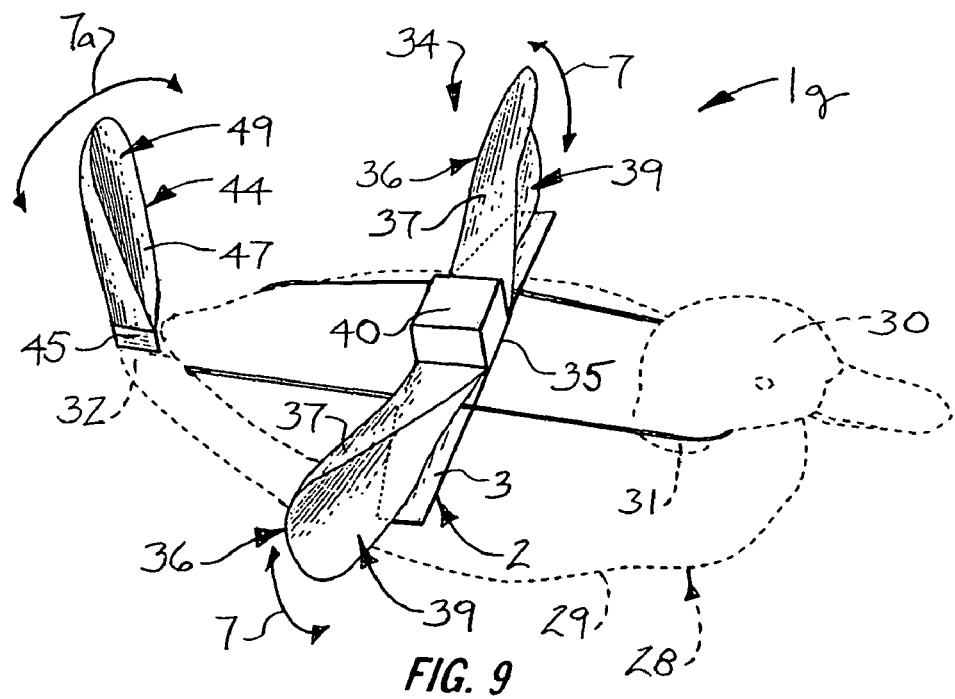
FIG. 9 is a perspective view of still another alternative illustrative embodiment of the air-actuated wing assembly, mounted on a fowl decoy (shown in phantom)

Referring next to FIG. 9 of the drawings, another alternative illustrative embodiment of the air-actuated wing assembly 1g includes an air-actuated forward wing 34 which may be similar in design to the air-actuated wing 34 of the air-actuated wing assembly 1f which was heretofore described with respect to FIG. 8. An air-actuated rearward half wing 44 may be additionally provided on the tail 32 of the decoy 28. The air-actuated rearward half wing 44 may include a wing body 45 which may be attached to the tail 32 of the decoy 28 using adhesive and/or other fastening technique known by those skilled in the art. The air-actuated rearward half wing 44 may include a generally elongated, curved or cupped wing panel 47 which defines a wing interior 49 and progressively widens from the wing body 45 toward the tip of the air-actuated half-wing 44. As the half-wing portions 36 of the air-actuated forward wing 34 oscillate as indicated by the arrows 7 in response to wind, the air-actuated rearward half wing 44 oscillates in a back-and-forth motion as indicated by the arrow 7a.

Figure 10:
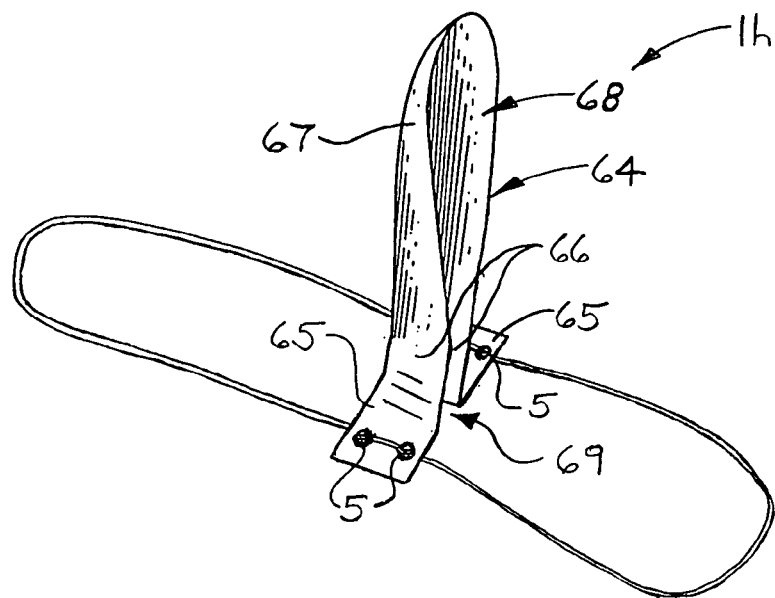
FIG. 10 is a perspective view of another alternative illustrative embodiment of the air-actuated wing assembly.

Referring next to FIG. 10 of the drawings, another alternative illustrative embodiment of the air-actuated wing assembly 1h includes an air-actuated half wing 64 having a pair of spaced-apart wing base portions 65. Each of the wing base portions 65 may be generally flat, and the wing base portions 65 may be disposed in generally coplanar relationship with respect to each other. A pair of spaced-apart cord openings 5 may be provided in each wing base portion 65 to receive the attachment cord 24. A pair of bottom wing portions 66 extends from the respective wing base portions 65. Each bottom wing portion 66 may be disposed in generally perpendicular relationship with respect to the wing base portion 65 from which it extends. A gap 69 may be defined between the adjacent, spaced-apart bottom wing portions 66. A generally elongated, curved or cupped wing panel 67 has a wing interior 68 which may communicate with the gap 69 between the bottom wing portions 66. The wing interior 68 may progressively widen from the bottom wing portions 66 toward the tip of the air-actuated half-wing 64.

In typical application of the air-actuated wing assembly 1h, the attachment cord 24 is extended around the neck 31 (FIG. 9) and the tail 32, respectively, of the decoy body 29. The air-actuated half wing 64 oscillates in a side-to-side motion responsive to contact by wind.

Figure 11:
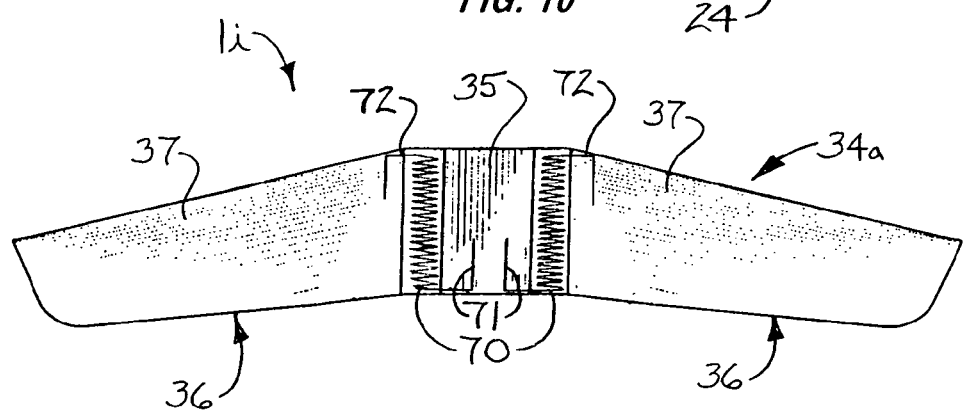
FIG. 11 is a top view of an air-actuated wing of another alternative illustrative embodiment of the air-actuated wing assembly.
Figure 12:
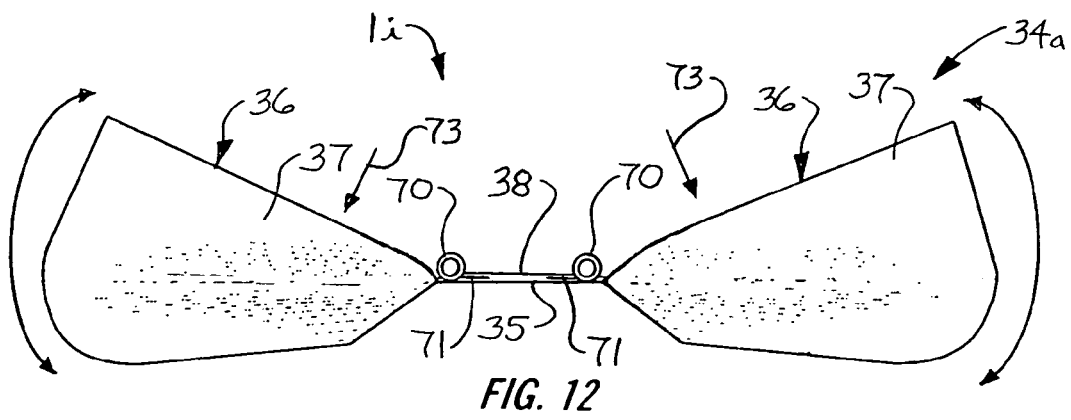
FIG. 12 is a front view of the air-actuated wing illustrated in FIG. 11.
Figure 13:
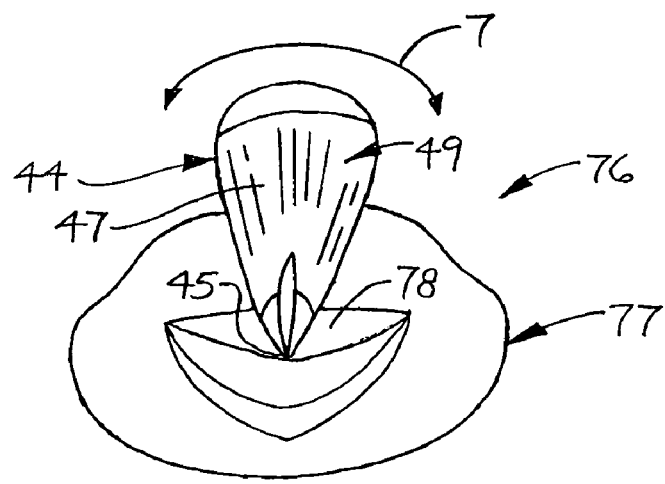
FIG. 13 is a rear view of an illustrative embodiment of a fowl decoy with an air-actuated wing assembly.

Referring next to FIGS. 11 and 12 of the drawings, another alternative illustrative embodiment of the air-actuated wing assembly 1i includes an air-actuated wing 34a which may be similar in design to the air-actuated wing 34 which was heretofore described with respect to FIG. 9. In the air-actuated wing 34a, a pair of wing bias springs 70 engages the wing body 35 and the respective half-wing portions 36. Each wing bias spring 70 may include a wing body engaging arm 71 which engages the wing body 35 and a wing engaging arm 72 which engages the corresponding half-wing portion 36. Accordingly, as indicated by the arrows 73 in FIG. 12, the wing bias springs 70 normally bias the respective half-wing portions 36 downwardly as wind contacts the interior surfaces of each wing panel 37 to oscillate the half-wing portions 36 against the bias exerted by the respective wing bias springs 70, as indicated by the arrows 7. Consequently, excessive bending of each half-wing portion 36 with respect to the wing body is reduced, preventing or reducing tearing or breaking of the junction between the half-wing portion 36 and the wing body 35.

Figure 14:
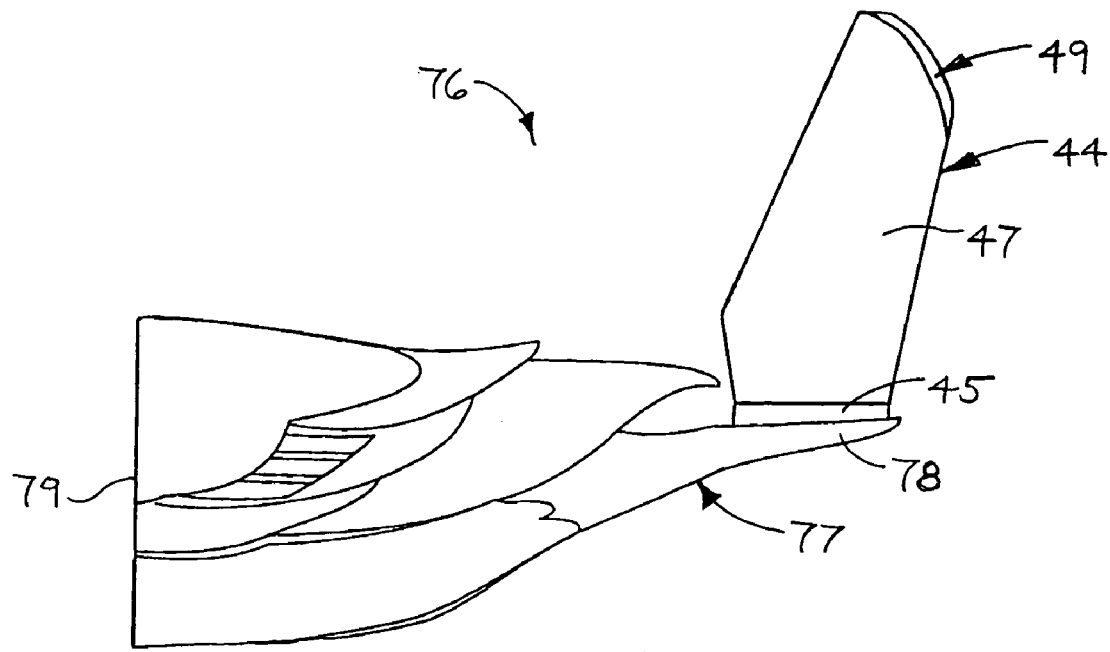
FIG. 14 is a side view of the fowl decoy with air-actuated wing assembly illustrated in FIG. 13.
Figure 15:
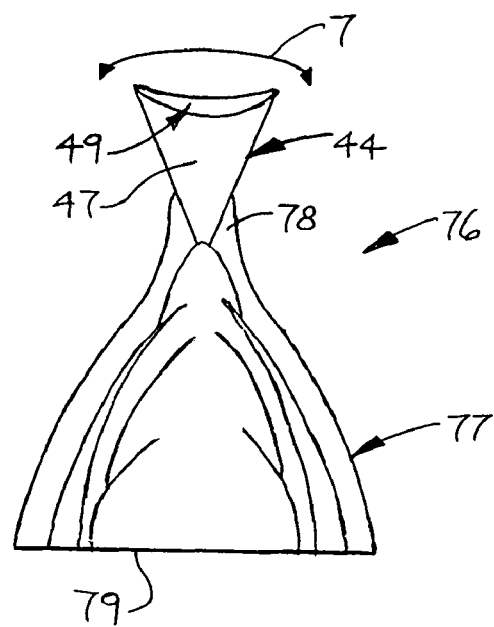
FIG. 15 is a top view of the fowl decoy with air-actuated wing assembly illustrated in FIG. 13.
Figure 16:
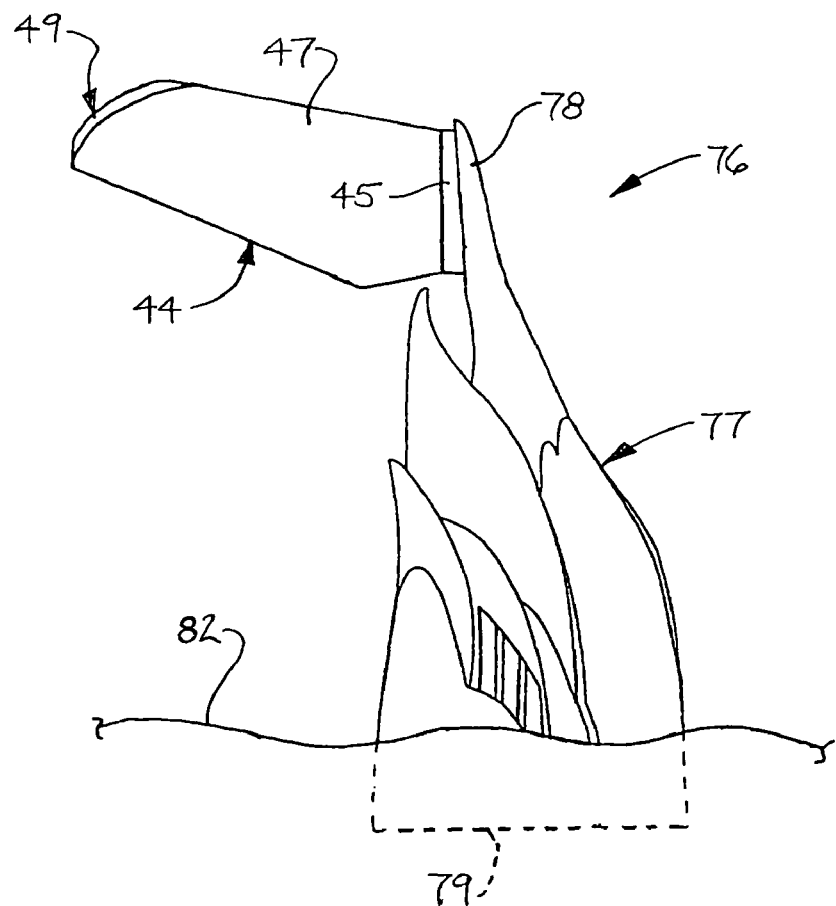
FIG. 16 is a side view of the fowl decoy with air-actuated wing assembly illustrated in FIG. 13, deployed in a functional position in a water body.

Referring next to FIGS. 13-16 of the drawings, an illustrative embodiment of a fowl decoy with wind-actuated wing assembly 76 is illustrated. The fowl decoy with wind-actuated wing assembly 76 includes a decoy tail portion 77 which may be a buoyant material such as plastic, for example and without limitation. The decoy tail portion 77 generally simulates the size, shape and appearance of the tail portion of a waterfowl such as a duck, for example and without limitation, and has a simulated decoy tail 78. As illustrated in FIGS. 14-16, the simulated decoy tail 78 may have a generally flat or planar front/bottom panel 79.

An air-actuated wing assembly having an air-actuated half wing 44 is provided on the simulated decoy tail 78. The air-actuated half wing 44 may be similar in design to the air-actuated half wing 44 which was heretofore described with respect to FIG. 9, having a wing body 45 which is attached to the simulated tail portion 78 and a generally elongated, curved or cupped wing panel 47 having a wing interior 49.

As illustrated in FIG. 16, in typical application of the fowl decoy with wind-actuated wing assembly 76, the decoy tail portion 77 is placed on a water body 82 with the front/bottom panel 79 submerged beneath the surface of the water body 82. This forward position of the fowl decoy with wind-actuated wing assembly 76 simulates feeding of a fowl beneath the surface of the water body 82. Accordingly, the air-actuated half wing 44 is exposed to wind which contacts the air-actuated half wing 44 and causes the air-actuated half wing 44 to oscillate in a back-and-forth movement, as indicated by the arrow 7 in FIGS. 13 and 15. This oscillating action of the air-actuated half wing 44 may attract waterfowl to the area of the water body 82 on which the fowl decoy with air-actuated wing assembly 76 floats for hunting purposes.

Figure 17:
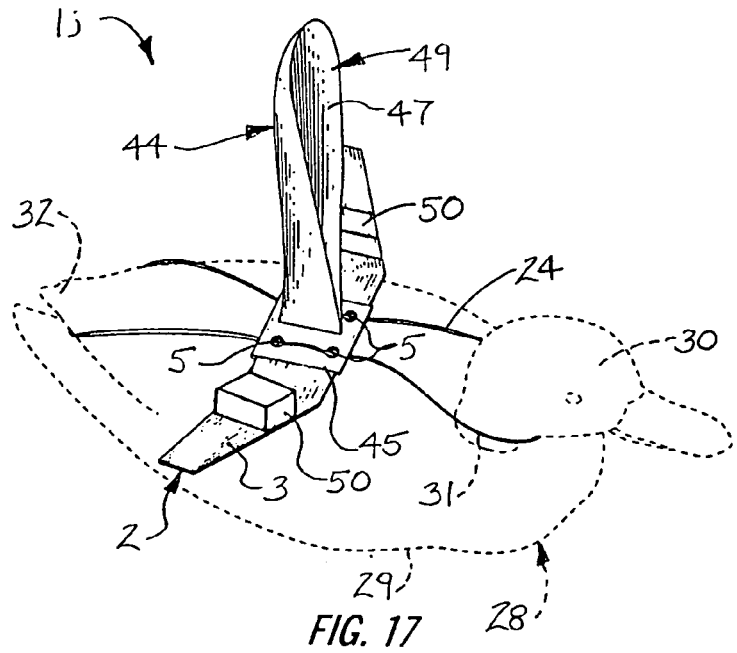
FIG. 17 is a front perspective view of an alternative illustrative embodiment of the air-actuated wing assembly, mounted on a fowl decoy (shown in phantom)

Referring next to FIG. 17, another illustrative embodiment of the air-actuated wing assembly 1j may be similar in design to the air-actuated wing assembly 1c which was heretofore described with respect to FIG. 4. In the air-actuated wing assembly 1j, a pair of wing cushions 50 is provided on the assembly base 2, on respective sides of the wing body 45. Accordingly, as it oscillates in a side-to-side motion, as indicated by the arrow 7 in FIG. 4, the air-actuated half wing 44 may strike the wing cushions 50 and minimize wear on the air-actuated half wing 44 which would otherwise result upon striking of the air-actuated half wing 44 against the assembly base 2.

Figure 18:
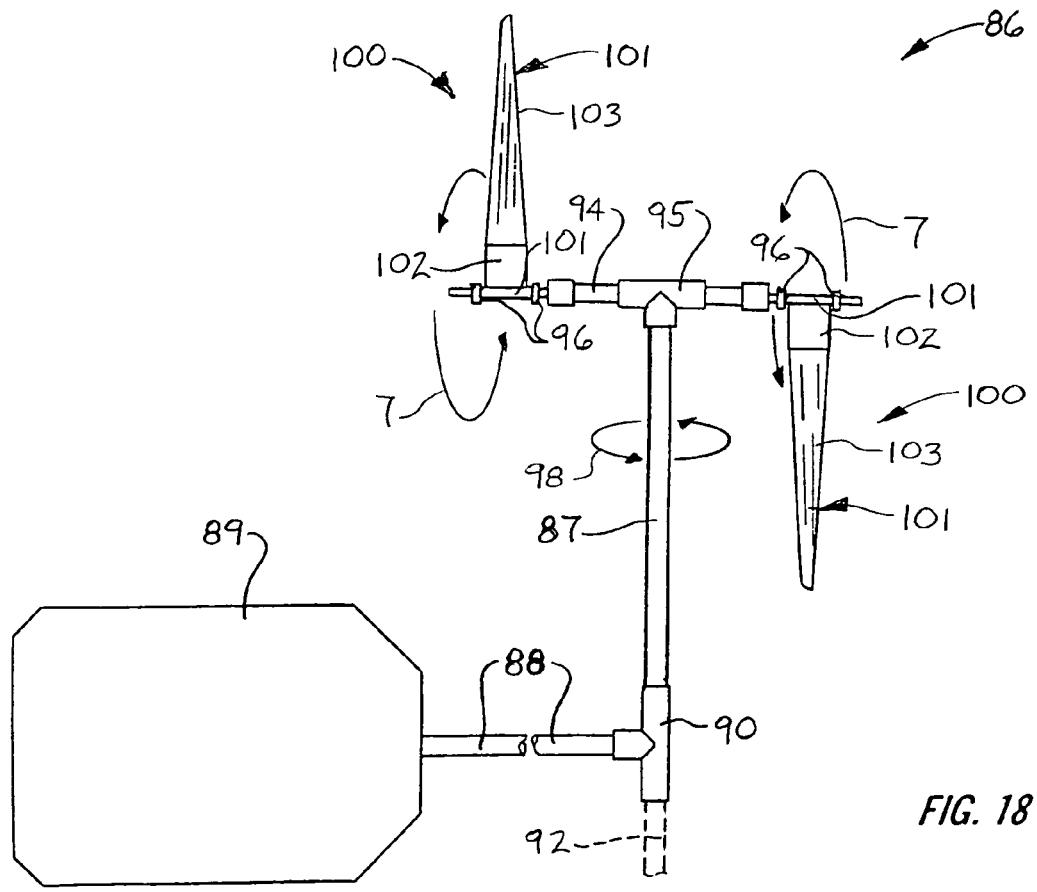
FIG. 18 is a side view of an illustrative embodiment of a wind vane with air-actuated wing assembly.

Referring next to FIG. 18 of the drawings, an air-actuated wind vane 86 is illustrated. The air-actuated wind vane 86 may include an elongated main shaft 87. The main shaft 87 may be adapted for connection to a wind vane support shaft 92 (shown in phantom) such as at a connecting shaft tee 90. The main shaft 87 may be capable of rotating with respect to the wind vane support shaft 92, as indicated by the arrow 98. A panel shaft 88 extends from the main shaft 87 such as at the connecting shaft tee 90. The panel shaft 88 may be disposed in generally perpendicular relationship with respect to the main shaft 87. A wind vane panel 89 is provided on the panel shaft 88.

A wing shaft 94 is attached to the main shaft 87, such as at a connecting shaft tee 95, and may be disposed in generally perpendicular relationship thereto. A pair of air-actuated half wings 100 is provided on the wing shaft 94, on respective sides of the tee 95. Each air-actuated half wing 100 may include a tubular wing body 101 which receives the wing shaft 94. A wing base 102 extends from the wing body 101. A generally elongated, cupped wing panel 103 extends from the wing base 102. The wing body 101 of each air-actuated half wing 100 may be secured between a pair of spaced-apart wing spacers 96 on the wing shaft 94. Each air-actuated half wing 100 is capable of rotating about the wing shaft 94 responsive to contact by wind, as indicated by the arrows 7.

In typical application, the air-actuated wind vane 86 may be mounted on a building (not illustrated), a sign (not illustrated) or the like. The shaft tee 90 may be connected to the wind vane support shaft 92. As wind is applied against the wind vane panel 89, the main shaft 87 may rotate with respect to the wind vane support shaft 92 as indicated by the arrow 98. As the wind contacts the air-actuated half wings 100, each air-actuated half wing 100 may freely rotate about the wing shaft 94, as indicated by the arrows 7.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. An air-actuated wing assembly, comprising:
   a flat, planar assembly base having a base panel with a pair of swept-back side wing portions;
   a flat, planar wing body carried by and oriented in parallel relationship with respect to said assembly base;
   at least one half-wing portion having a generally elongated, flexible, cupped wing panel extending from said wing body substantially equidistant between said side wing portions of said assembly base with a first end of said wing panel carried by said wing body and a second end spaced-apart from said first end, said wing panel haling a forwardly-facing wing interior gradually widening from said first end to said second end;
   wherein said half-wing portion is adapted to oscillate within a plane perpendicular to a plane of said assembly base; and
   an attachment mechanism carried by said wing body wherein said attachment mechanism is sized to attach to a neck portion and a tail portion of a decoy during use.

2. The air-actuated wing assembly of claim 1 wherein said base is elongated.

3. The air-actuated wing assembly of claim 1 wherein said attachment mechanism comprises an attachment cord.

4. The air-actuated wing assembly of claim 1 wherein said at least one half-wing portion is normally generally perpendicular with respect to said base.

5. The air-actuated wing assembly of claim 1 wherein said at least one half-wing portion comprises a pair of half-wing portions extending from opposite sides of said wing body.

6. The air-actuated wing assembly of claim 5 further comprising a wing spacer provided on said wing body between said pair of half-wing portions.

7. The air-actuated wing assembly of claim 1 further comprising a waterfowl decoy and wherein said wing body is carried by said waterfowl decoy.

* * * * *